June 30, 1942. B. L. KNAPP 2,288,532
FILTER DEVICE
Filed Sept. 12, 1939
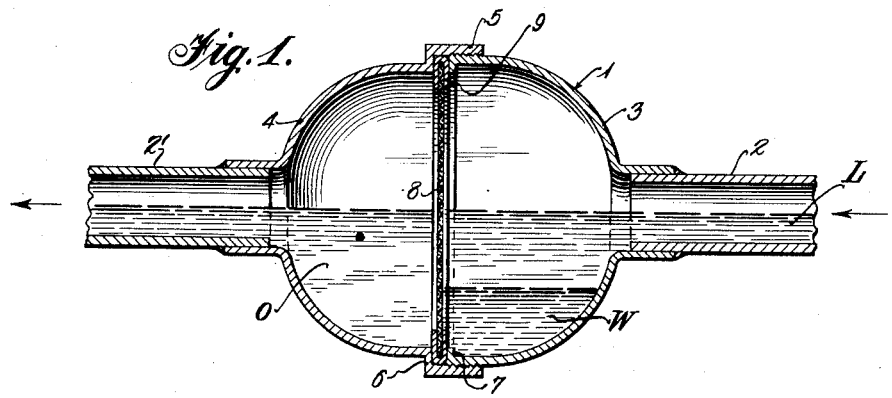
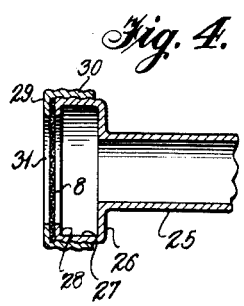
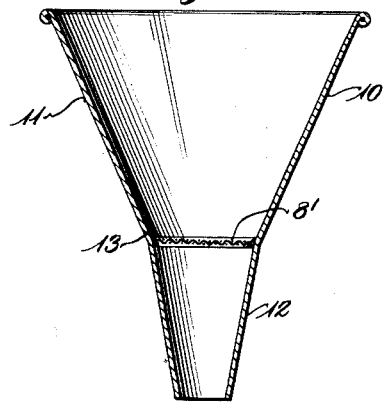
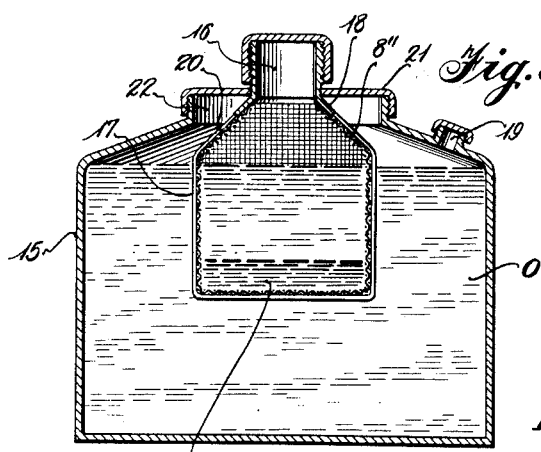
Inventor
Budd L. Knapp
By Stevens and Davis
Attorneys Patented June 30, 1942

2,288,532

UNITED STATES PATENT OFFICE 2,288,532

FILTER DEVICE

Budd L. Knapp, Skaneateles, N. Y.

Application September 12, 1939, Serial No. 294,529

2 Claims. (Cl. 210—169)

This invention relates to filters and especially to such devices incorporating filtering screens adapted to remove water from fluids due to the difference in surface tension characteristics and/or viscosity of the two liquids. While this invention is concerned with the separation of water from fluids in general, which have a lesser surface tension or viscosity, it is particularly concerned with the removal of water from various grades and/or mixtures of oil, and including oil having low boiling points such as gasoline, kerosene and the like.

Various methods and apparatus have been proposed for filtering fluids to remove all types of foreign matter including water. It is common practice to employ wire screens for removing dirt and the like from fluids and likewise it is well known to use chamois and fibrous materials for removing water from fluids. All of these various arrangements have numerous drawbacks, however, particularly in the filtration of water from fluids, especially fuel oils, such as gasoline, having a low boiling point. In passing the fluids through the filtering member it is bound to pick up a slight amount of lint when a fibrous filter is used, or when a chamois is employed the filtration is very slow and the chamois throws off a lint which, due to its animal nature, it is substantially impossible to remove when accumulated in a carburetor or from other small dispensing apertures. Moreover, these unsatisfactory filter members have a comparatively short life and consequently must be replaced frequently.

It is an object of the present invention to produce an inexpensive and practical filter of simplified construction which will efficiently separate substantially all foreign matter, including water, from fluids and, at the same time, will not throw off lint and the like. This invention contemplates the use of a filter member which will capitalize upon the difference in the surface tension characteristics between fluid and any aqueous matter mixed therein and furthermore will withstand hard use and relatively high pressure for a considerable period of time.

Briefly, the present invention comprises a filter member formed of a woven wire screen having a sufficiently fine mesh and small enough apertures to prevent the passage of water, particularly when wet with fluid, due to its surface tension characteristics. This screen will permit the passage of fluid, however, in view of the fact that the surface tension ratio between the two liquids is approximately 3 to 1. The screen is made of a metal which will resist rust and corrosion and which is not susceptible to stretching under pressure. The screen may be employed in various types of apparatus such as the usual funnels, line filters, and the like and it is further contemplated that such a screen be used within containers. For instance a wire screen cage may be built into a storage container so that the fluid which is poured into the container will be filtered and the water will be trapped by the cage and prevented from being dispensed along with the fluid from the container. In the use of this wire screen filter member it is always necessary to provide for the accommodation of the water so that the fluid may flow over the water and through the screen and the screen will not become blocked by the water, in which case flow would be stopped completely or the water might be forced through the screen in the event that the pressure was great enough. The screen cage may vary in size according to the size of the container so as to accommodate a proportional amount of water and fluid.

The invention both as to its organization and method of operation, together with additional objects and advantages thereof, will best be understood from the following description of the specific embodiments when read in connection with the accompanying drawing wherein like reference characters indicate like parts throughout.

Figure 1 is a cross-sectional view of a line filter comprising a filter screen according to the present invention;

Figure 2 is a cross-sectional view of a funnel having a filter screen incorporated therein;

Figure 3 is a vertical cross-sectional view of a storage container incorporating a filter cage; and Figure 4 is a cross-sectional view of a modified form of the invention wherein the filter device is positioned on the end of a dispensing line.

Referring to the drawing, and specifically to Fig. 1, it will be seen that a bulb type of filter device 1 may be inserted in an oil line 2—2'. This bulb filter device 1 may comprise two shells 3 and 4 which may be threaded together by means of an overhanging collar 5 carried by the shell 4. The shell 4 is provided with a radially extending flange 6 which supports the overhanging collar 5 and the shell 3 is provided with an inwardly extending flange 7 to coincide with the radial flange 6. A filter screen 8 may be positioned between the flanges 6 and 7 and thereby held rigidly in place when the shells 3 and 4 are threaded together. This filter screen 8 may be bound by a U-shaped ferrule 9 both to provide rigidity for the screen and to act as a gasket between the joint of the shells 3 and 4. It is necessary that the joint between the screen 8 and the shells 3 and 4 be tightly sealed so as to prevent any seepage of water therethrough. The filter bulb 1 and the ferrule 9 may be formed of any desirable material such as metal, rubber or one of the many plastics which are now springing into commercial use. Likewise the bulb may comprise an enlargement of the oil line, or the screen 8 may be located with the pipe when said pipe is of sufficient size.

The filter screen 8 comprises a wire that is woven into such a fine mesh that water is incapable of passing through the openings between the mesh due to its surface tension characteristics and/or its viscosity and specific gravity. On the other hand, due to the fact that water has three times as great a surface tension as many fluids, such as oil, this screen having a mesh which withholds water will permit the passage of such fluids. In some instances when the differential in surface tension is not particularly great or the mesh of the screen is slightly large it may be necessary to first wet the screen with the fluid or oil to prevent the water from passing through the screen. It has been found for instance that a screen of 150 mesh, which has 22,500 openings to the square inch, is the most satisfactory size for general use. In certain instances, however, a screen having a somewhat larger mesh may be used. Certain types of equipment use a mixture of relatively heavy oil with gasoline and it has been found that a screen of 120 mesh, having 14,400 openings to the square inch, will withhold water when the screen is wet with a mixture of approximately ½ pint of oil to a gallon of gasoline. It will be noted that when such a large mesh screen is used the screen must first be wet by the mixture, prior to the presence of water, in order to prevent the passage of water, and furthermore is only practical when used where small quantities of water are encountered.

In addition to the size of the mesh another feature of this screen is the material from which it is fabricated. It has been found for instance that certain metals are too soft to stand much pressure and consequently when in use soon become stretched so that they are no longer useful in their principal function of withholding water due to surface tension. Certain metals however have proven extremely satisfactory in this respect and in addition prove to have higher surface tension characteristics with respect to water than other metals. The most satisfactory material which has been found at the present time is phosphor bronze. This alloy has all of the desirable features which are necessary for a long efficient life of the screen.

Phosphor bronze is extremely strong and will withstand considerable pressure over a period of time without stretching. In addition it is non-rusting and will not be affected by continuous contact with the various liquids and particularly water. Furthermore it has superior surface tension characteristics with respect to water and provides extremely efficient operation. An additional advantage of phosphor bronze is its cost which is not excessive, and consequently is adapted for commercial use more readily than some other metals or alloys which may be sufficiently satisfactory in their operation. Other metals and alloys may be employed, however, according to the use of the filter and the commercial practicability of its manufacture. For instance, chromium is non-rusting, has excellent surface tension characteristics with respect to water and is reasonably strong.

When the wire screen 8 is employed in a line filter device 1, as shown in Fig. 1, the liquid L from a source of supply will be filtered as it passes through the screen. The water and other foreign matter will fail to pass through the screen and will collect in the bottom of the shell 3 as indicated by the mass W. The oil O, however, will pass over the water W and through the screen due to its surface tension characteristics, into the shell 4 and on through the line 2'. Periodically the passage of the fluid through the line may be stopped and the shells 3 and 4 separated so that the water and other foreign matter W may be removed. Likewise, if desired, a petcock (not shown) may be positioned in the bottom of the shell 3 so that the water and foreign matter W may be withdrawn therethrough.

It is necessary to design the filter device 1 so as to form a reservoir for the water W below the surface of the liquid L, and will permit the oil O to flow over the top of said water W and through the screen 8. In the event that the oil is unable to flow over the water W, but merely against it, the water will then clog the screen 8 and prevent the passage of the oil O, or if the pressure of the fluid L is sufficiently great the water W might even be forced through the screen 8.

A modification of the present invention comprises a funnel as shown in Fig. 2. The funnel 10 may be of any desired form and shape and may comprise the usual tapered receiver portion 11 and somewhat narrower dispensing spout 12. A filtering screen 8' may be positioned within the portion 11 so that when oil is poured into the funnel the oil will drop through the screen 8', but any water and other foreign matter will not pass through the screen and will be collected within the portion 11. It is necessary that the edges of the screen 8' be positively sealed to the walls of the portion 11 so as to prevent the formation of openings which might be large enough to pass water. In the present instance this sealing is shown as a bead of solder 13 but it is contemplated that the screen 8' may be formed as a removable unit and provided with a sealing ring, around its edges, of any desirable material which is suitable for the purpose.

Still another modification of this invention is shown in Fig. 3, wherein a filter cage 8" is formed of the hereinbefore described woven wire screening and is installed directly beneath the filling spout 16 of the container 15. The filter cage 8" may be provided with a supporting framework 17 and may be secured to a tapered flange 18 depending from the spout 16 or fastened directly to the body of the container. According to this construction the fluid may be poured through the opening 16 into the cage 8", whereupon any water in the fluid will collect in the bottom of the cage as a mass W but the fluid or oil O will flow through the walls of the cage into the main portion of the container 15. When it is desired to remove the fluid or oil from the container it may be poured out of the dispensing spout 19 and will be free of water in view of the fact that all of the water has been trapped within the cage 8". Before the container is again filled, the water W may be emptied from the cage 8" which is provided with tapering walls 20 at its upper portion to cause the water to flow directly through the spout 16.

In some instances it may be desirable to remove the water immediately after the container has been filled, in which event the container may be provided with a false cover 21 that may support the filling spout 16 and the cage 8". In the present instance this false cover is shown as being threaded on the upstanding flange 22 formed on the breast of the container 15. By this arrangement the false cover 21, including the filter cage 8", may be removed from the container and the water W emptied from the cage, after which the cover 21 may be replaced. While the filter cage 8" is shown as being secured directly below the filling spout 16 it is contemplated that an elongated cage might be placed over the dispensing nozzle 19, in which event the water would not be separated from the oil until the oil is poured through the nozzle 19. In such a structure it would be necessary to provide an elongated or bulbous cage so that the water could not block the entire surface of the filter and thereby prevent the passage of the oil, or be forced therethrough. Such a filter cage could likewise be positioned exteriorly of the dispensing nozzle 19 but would then be susceptible to damage by the handling of the container.

The structure shown in Fig. 3 is particularly adapted for certain uses. For instance some types of apparatus, such as outboard motors, use a fuel oil mixture of relatively heavy oil having a high boiling point and gasoline. The usual outboard motor uses a mixture of ¾ of a pint of oil S. A. E. #40 to a gallon of gasoline. The container 15 may be provided with a filter cage 8" comprising a mesh which will not pass the heavy oil until diluted with the gasoline. Accordingly the cage 8" may comprise a size proportional to the size of the container, the cage first filled with the heavy oil after which the gasoline is added. For instance a 1¼ gallon container would have a cage of one pint capacity, a 2½ gallon container would have a cage of one quart capacity and a 5 gallon container would have a cage of 1½ quarts capacity. According to this arrangement the cage serves the double purpose of filtering water from the oils and of providing convenient measuring facilities for proportioning the different types of oil.

As hereinbefore pointed out, it may be desirable to provide the filter screen adjacent the dispensing end of a nozzle hose, tube or the like but that cage structure is impractical. Accordingly a structure such as shown in Fig. 4 may be employed in such a capacity. The nozzle, hose, tube, pipe or the like, indicated by the numeral 25 may be provided with an enlarged end 26, the periphery of which is formed into or provided with threads 27 and which is provided with an inturned flange 28. An open cap 29 may be adapted to fit over the enlargement 26 and be secured thereto by threads 30 which may cooperate with threads 27. The cap is provided with an opening 31 in its face. A filter screen 8 may be positioned between the inturned flange 28 and the face of the cap 29 and thereby filter the fluid as it is dispensed from the tube 25 through the opening 31, any water and other foreign matter being collected in the enlargement 26.

Although certain specific embodiments of the present invention have been shown and described many modifications thereof are possible, and the present disclosure should be construed only in an illustrative sense. Although several of the specific examples and embodiments of the invention are described as adapted for the removal of water from oil, it will be understood that the invention contemplates the removal of quantities of water from any other fluids having like characteristics with respect to water, particularly when the filter screen is first wet with said fluids. The present invention, therefore, is not to be restricted except in so far as is necessitated by the prior art and the spirit of the appended claims.

I claim:

1. In combination with a container, a removable cover therefor, a filling spout in said cover, a filter cage fixed to said cover adjacent said spout and adapted to be positioned within said container, said cage having a diameter greater than that of the spout but less than that of the removable cover, said cage comprising a screen having sufficiently small apertures to prevent the passage of water due to the surface tension characteristics therebetween but will permit the passage of other fluids due to the differential between their surface tension characteristics.

2. In combination with a container having a filling spout in the top thereof, a filter cage adapted to be positioned within said container adjacent said spout, said cage comprising a screen having sufficiently small apertures to prevent the passage of water and relatively heavy oils having high boiling points due to their surface tension characteristics, but will permit the passage of said heavy oils when diluted with relatively light oils having low boiling points, said cage being of a predetermined size that is proportional to the size of the container, said proportion being of the ratio of approximately 1 to 10.

BUDD L. KNAPP.